July 28, 1925.                     C. R. MONNEY                    1,547,940
             APPARATUS FOR EFFECTING THE TRANSFORMATIONS OF SPHERICAL COORDINATES
                          Filed Feb. 26, 1924           3 Sheets-Sheet 1
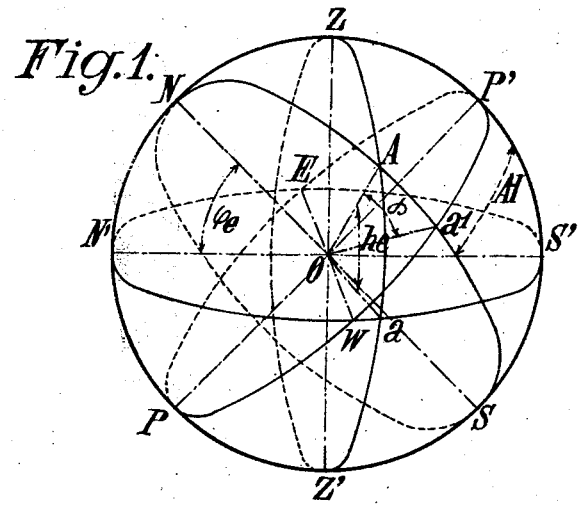
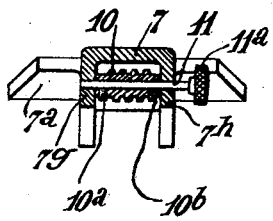 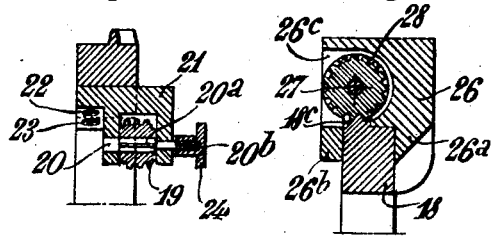
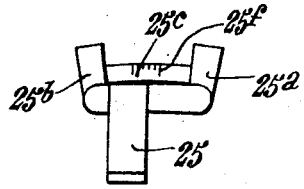
Inventor
C. R. Monney
By Marks & Clerk
Attys July 28, 1925.
C. R. MONNEY
1,547,940
APPARATUS FOR EFFECTING THE TRANSFORMATIONS OF SPHERICAL COORDINATES
Filed Feb. 26, 1924
3 Sheets-Sheet 2

July 28, 1925.
C. R. MONNEY
1,547,940
APPARATUS FOR EFFECTING THE TRANSFORMATIONS OF SPHERICAL COORDINATES
Filed Feb. 26, 1924    3 Sheets-Sheet 3
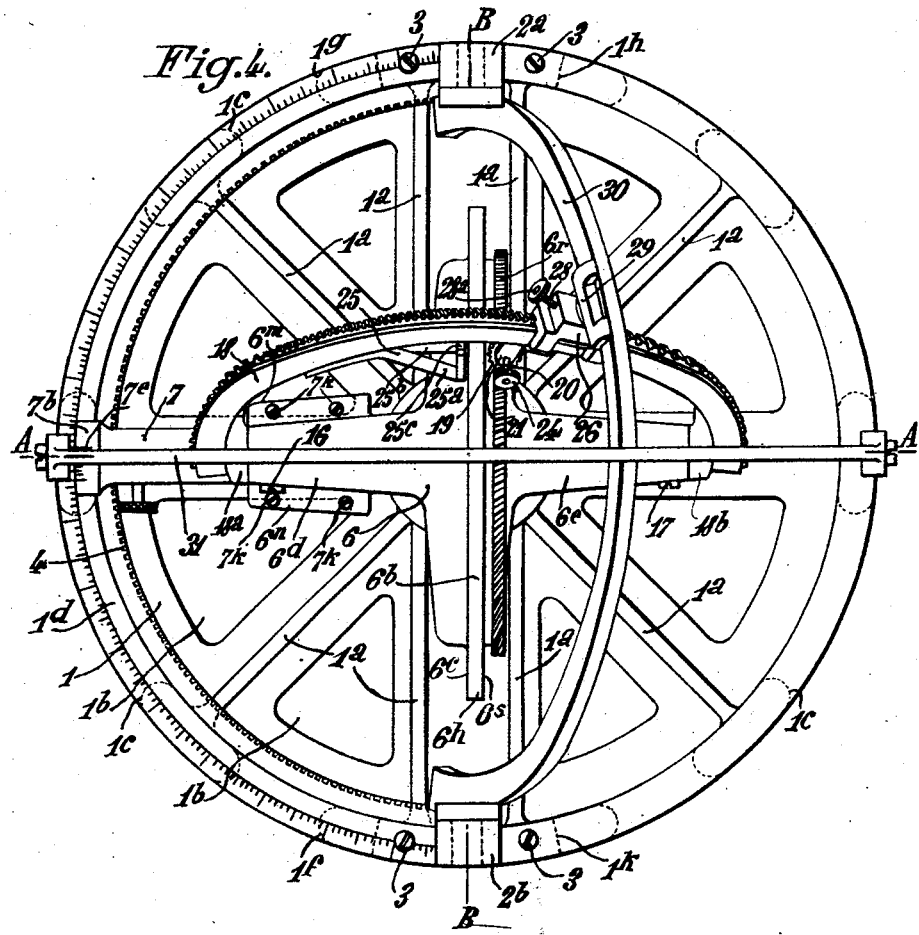
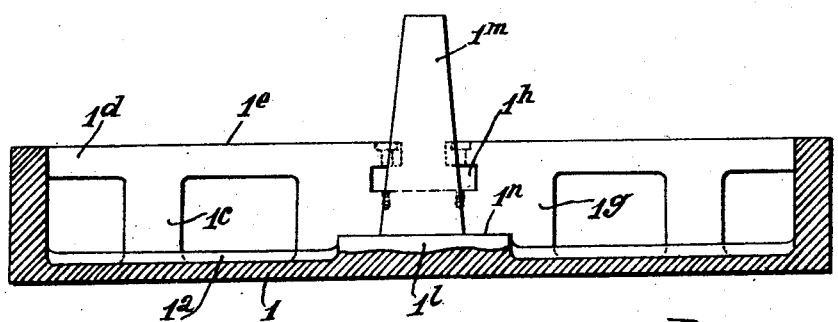

Patented July 28, 1925.

1,547,940

UNITED STATES PATENT OFFICE.

CHARLES ROGER MONNEY, OF PARIS, FRANCE.

APPARATUS FOR EFFECTING THE TRANSFORMATIONS OF SPHERICAL COORDINATES.

Application filed February 26, 1924. Serial No. 695,363.

*To all whom it may concern:*

Be it known that I, CHARLES ROGER MONNEY, a citizen of the French Republic, residing 67 Rue de Levis, Paris, France, have invented new and useful Improvements in an Apparatus for Effecting the Transformations of Spherical Coordinates, of which the following is the specification.

This invention relates to an apparatus for effecting the transformations of spherical coordinates, more particularly applicable to the execution of calculus of spherical trigonometry relating to the diurnal movement of the stars and in which the parallactic angle does not intervene.

This apparatus consists of the combination of two systems each similarly composed of two concentric circles the planes of which are at right angles; one of these circles rotates relatively to the other about a diameter at right angles to the plane of the first circle and carries a rider; both systems are concentrically arranged, so that the axes of rotation of the movable circles are in one and the same fixed plane, both systems being capable of rotating relatively to each other about a diameter at right angles to this plane, so as to ensure their relative orientation, the riders being connected by a joint the geometrical axis of which passes through the common centre of the circles.

The apparatus forming the subject matter of the invention permits of the mechanical execution of all the problems which lead back to the following:

Five quantities being considered:

*a.*—The two coordinates of a point in one of the systems,

*b.*—The two coordinates of this point in the other system;

*c.*—The relative orientation of the two systems.

To determine two of these quantities, the three others being known.

The applications of the apparatus are obviously very numerous. By way of example, the following applications can be cited:

*a.*—Calculation of the position of a ship at sea (position and orientation of the line of altitude);

*b.*—Calculation of the azimuth by the hour;

*c.*—Calculation of the azimuth by the altitude;

*d.*—Determination of a star knowing its altitude, its azimuth and the latitude of the spot of observation;

*e.*—Calculation of the altitude of a star at a given hour in a given spot;

*f.*—Calculation of the hour of rising and setting of a star at a given spot.

The accompanying drawing illustrates, by way of example only a form of carrying out the invention, the operation of which will be described hereafter in the particular case of calculation of a ship's place at sea.

Fig. 1 is an explanatory diagram.

Fig. 4 is a plan view,

Fig. 5 is a partial section, on an enlarged scale, according to line C—C of Fig. 2, Fig. 6 is a partial section, on an enlarged scale, according to line D—D of Fig. 2, Fig. 7 is a partial section, on an enlarged scale, according to line E—E of Fig. 2.

Fig. 8 is an elevation of the base or socle.

Fig. 9 is a side view, on an enlarged scale, of a detail.

Figure 3:
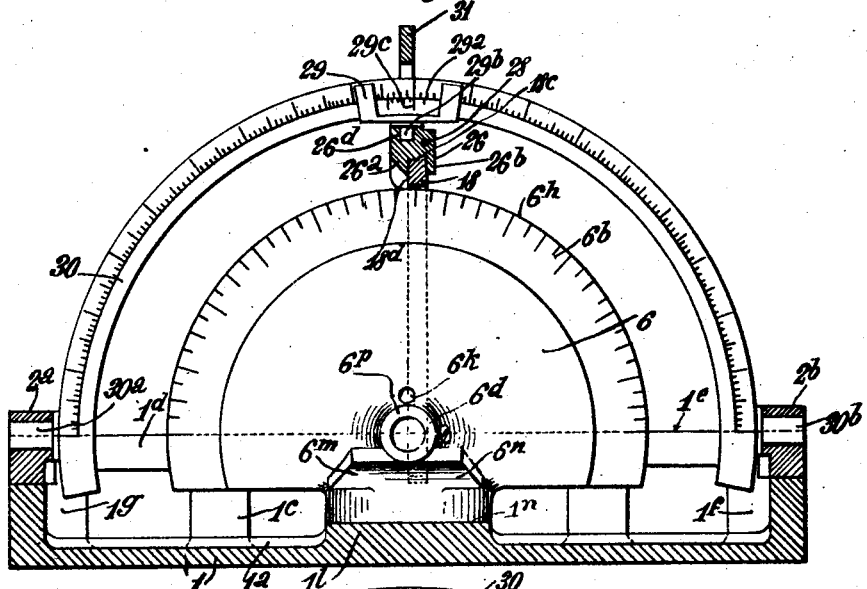
Fig. 3 is a sectional elevation according to line B—B of Fig. 4.

Referring to Fig. 1, O designates the present position, of for instance the ship on which the apparatus is placed, Z Z′ the vertical at O, N S the parallel at O at the axis of the world. The circle N′ Z S′ Z′ which is in the plane of the drawing, is the meridian circle, and N′ W S′ E represents the horizon circle. The circle E P W P′ constitutes the circle of the equator; N A S the circle of declination.

In these conditions, the star A is situated in zenithal coordinates by the zenithal distance Z A, or the altitude A$a$ which is the complement thereof, and by the azimuth represented by the angle A Z P′.

The local coordinates of this star are the polar distance N A, or the declination A$a^1$, which is the complement thereof, and the horary angle A N Z.

On the other hand, the relative orientation of the two systems of coordinates is given by the latitude, represented by the angle N O N′.

If an apparatus indicating the various circles illustrated is available, it will be possible, by knowing three of the previously indicated quantities, that is to say the coordinates of a star in each of the systems and the relative orientation of these systems, to indicate this star and, consequently, to determine the position by simply reading the two other quantities.

Figure 2:
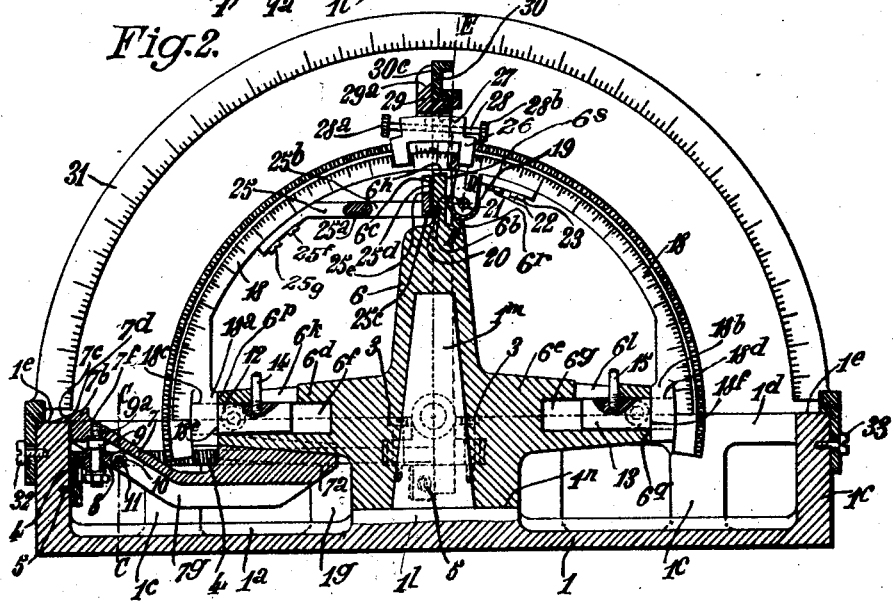
Fig. 2 is a sectional elevation according to line A—A of Fig. 4.

The apparatus illustrated in Figs. 2 to 9 permits the accomplishment of these conditions, but in this special form of construction, the whole of the device is simplified owing to the fact that the circles are replaced by half-circles. This simplification offers no inconvenience in all the cases in which the angles are smaller than $\pi$, or when they are greater than $\pi$, but intervene, in the calculations usually executed, by their cosine. They can in fact be replaced, in this case, by the supplementary angle.

The apparatus rests on a plain circular base 1 strengthened on its upper face by ribs $1^a$ and recessed at $1^b$ for the sake of lightness. Columns or posts $1^c$ are cast with the base 1 and support a ring, preferably of square cross section, and the upper face $1^e$ of which is carefully ground, so as to form a plane. Two of the diametrically opposed columns, designated by $1^f$ and $1^g$, are wider than the others and are cut away at $1^h$ and $1^k$ for receiving bearings $2^a$ and $2^b$ which are secured by means of screws 3. The base 1 is provided with a central boss or hub $1^l$ on the top of which is arranged a pivot $1^m$ of frusto-conical shape. The upper surface $1^n$ of the boss or hub $1^l$ is also ground so as to be perfectly plane and parallel to the surface $1^e$ of the ring $1^d$. The geometrical axis of the pivot $1^m$ is exactly at right angles to the surface $1^n$ and passes through the centre of the annular surface $1^e$.

A toothed segment 4 is secured on the columns $1^c$, $1^f$ and $1^g$, by means of screws 5; the toothed segment 4 covers a half circumference and extends between the columns $1^f$ and $1^g$. On the other hand, a member 6, which is described more in detail hereafter, is mounted on the pivot $1^m$ so as to be capable of pivoting on the latter. The lower face $6^a$ of this member 6 is perfectly smooth and, when the member 6 is mounted on the pivot $1^m$, the face $6^a$ must come in contact with the surface $1^n$ of the boss or hub $1^b$. The member 6 has a circular plate $6^b$ which extends over a little more than a half circumference, as clearly shown in Fig. 3. The faces $6^c$ and $6^s$ of this plate are parallel planes and the plane of the face $6^c$ must pass, when the member 6 is mounted on the pivot, through the geometrical axis of this pivot. On the other hand, the member 6 has two bosses $6^d$ and $6^e$ which exteriorly are preferably of frustum shape and are perforated with cylindrical holes $6^f$ and $6^g$. The geometrical axes of the holes $6^f$ and $6^g$ are in a straight line, which latter meets the geometrical axis of the pivot $1^m$ and is at right angles to the plane of the faces $6^c$ and $6^d$. This straight line thus constitutes the geometrical axis of the cylindrical surface $6^h$ limiting the circular plate $6^b$. Finally, long mortices $6^k$ and $6^l$ are provided in the bosses $6^d$ and $6^e$, these mortices opening in the cylindrical bores $6^f$ and $6^g$.

The boss $6^d$ has, at its lower part, plane lugs $6^m$ and $6^n$ the lower surface of which are plane; an arm 7 is provided with a plate $7^a$ (Fig. 5) the upper surface of which corresponds to the lower surface of the lugs $6^m$ and $6^n$; the plate $7^a$ is secured against these lugs and under the latter, for instance, by means of screws $7^k$. The arm 7 is radially extended so as to form at its end a nose $7^b$ the lower face $7^c$ of which is plane and fits against the upper surface $1^e$ of the ring $1^d$. The upper face $7^d$ of the nose $7^b$ is inclined and carries a reference line $7^e$; this line, if it was extended, would meet the geometrical axis of the pivot $1^m$.

From the foregoing description, it will be clearly seen that the member 6 can rotate on the pivot $1^m$, the nose $7^b$ moving along the upper surface $1^e$ of the ring $1^d$. For effecting this displacement with the necessary precision, the following means are preferably used:

A worm wheel 8 is mounted on a shaft 9 so as to be capable of rotating on the same; this shaft is screw-threaded at $9^a$ and is screwed in a threaded hole $7^f$ of the arm 7. This arm has a U shaped cross section, as shown in Fig. 5. A worm 10, so cut as to gear with the worm wheel 8, is mounted on a shaft 11 on which it is secured by screws $10^a$ and $10^b$, the said shaft 11 passing through holes made in the lugs $7^g$ and $7^h$ of the arm 7 and carrying an operating knob $11^a$. The worm wheel 8 also gears with the toothed segment 4 so that by causing the worm 10 to rotate by means of the operating knob $11^a$, the wheel 8 is caused to rotate and run on the toothed segment 4, thus carrying round the member 6 about the pivot $1^m$. Cylindrical shafts 12 and 13 fit in the bores $6^f$ and $6^g$; each of these shafts is perforated with a threaded hole in which are screwed threaded fingers 14 and 15 which pass through the mortices $6^k$ and $6^l$. The shafts 12 and 13 have a length slightly less than or at the most equal to the depth of the holes $6^f$ and $6^g$, and the threaded holes in which are screwed the threaded fingers 14 and 15 are so arranged that, when these fingers are brought back in the direction of the pivot $1^m$ until they abut against the bottom of the corresponding mortices, the shafts 12 and 13 no longer project outside the bores $6^f$ and $6^g$. Screws 16 and 17, which are screwed in the threaded holes of the bosses $6^d$ and $6^e$, ensure of the arranging of the shafts 12 and 13 in any desired position.

A member 18, which is circular and the periphery of which covers a little more than a half circle carries two diametrally opposed bosses $18^a$ and $18^b$ perforated with cylindrical holes $18^c$ and $18^d$ the geometrical axes of which coincide and form a diameter. The inner faces $18^e$ and $18^f$ of the bosses $18^a$ and $18^b$ are plane, parallel and at right angles to the above mentioned diameter. They fit exactly against the faces $6^p$ and $6^q$ of the bosses $6^d$ and $6^e$. The shafts 12 and 13 enter the bores $18^c$ and $18^d$, so that, in the position illustrated in Fig. 2, the member 18 may rotate on the said shafts 12 and 13. For effecting this rotation with precision, the member 6 is provided with helical teeth formed on a circular projection $6^r$; a worm 19 gears with these teeth and it is mounted on a shaft 20 so as to rotate with this shaft. The shaft 20 carries for instance, for that purpose, a journal $20^a$ having a square cross section and on which is mounted the worm 19. The shaft 20 is journalled in holes provided in a support 21 which is secured on the member 18 by screws 22 and 23 for instance; the shaft 20 is moreover provided with an operating knob 24 which, for instance, is screwed on the screw threaded portion $20^b$ of the said shaft.

The member 18 also carries an index 25 which is secured thereto by means of screws $25^f$ and $25^g$ for instance. This index has two arms $25^a$ and $25^b$ connected by a flat part $25^c$ (Fig. 9 in particular); the face $25^d$ of this flat part is, when the index 25 is mounted on the member 18, parallel to the face $6^c$ of the plate $6^b$ and arranged very near this face $6^c$. The part $25^c$ is bevelled at $25^e$ and carries a reference line $25^f$ which, if it was extended, would meet the geometrical axis of the holes $6^f$ and $6^g$.

On the member 18 is mounted a rider 26 which embraces the outer edges of the said member 18 through the two ledges $26^a$ and $26^b$. The ledge $26^a$ is bevelled. On the other hand, the rider 26 is recessed at $26^c$ (Fig. 7) for receiving a worm 27 rigidly secured on the shaft 28 which on either side extends beyond the rider 26, so as to receive on either side an operating knob $28^a$, $28^b$. The worm 27 gears with helical teeth formed on a circular projection $18^e$ of the member 18. On the other hand, the rider 26 is provided with a cylindrical hole $26^d$ the geometrical axis of which, if it was extended, would constitute a radius of the member 18, the face $18^d$ of which is smooth, the plane of this face passing through the common geometrical axis of the bores $6^f$—$6^g$. In the cylindrical hole $26^d$ fits a shaft $29^b$ of another rider 29, which embraces the inner edges of a circular member 30, described hereafter. The rider 29 can therefore freely rotate relatively to the rider 26.

This rider 29 is bevelled at $29^a$, this oblique surface bearing a reference line $29^c$.

The circular member 30, on the inner periphery of which the rider 29 moves, extends over a little more than a half circle and carries two trunnions $30^a$ and $30^b$ the geometrical axes of which are in alignment and constitute a diameter. These trunnions $30^a$ and $30^b$ are mounted in the bearings $2^a$ and $2^b$ and the above mentioned diameter is then in the same plane as the upper face $1^c$ of the ring $1^d$. On the other hand, the face $30^c$ of the member 30 is smooth; its plane contains the above mentioned diameter which also meets the geometrical axis of the pivot $1^m$.

Finally, a circular member 31 is secured by means of the screws 32 and 33, on the ring $1^d$, so that its middle plane is at right angles to the geometrical axis of the trunnions $30^a$—$30^b$, and contains the geometrical axis of the pivot $1^m$.

In the above described device, the system of zenithal coordinates is indicated by the half-circle 31, which represents the horizon circle, and by the half-circle 30, which represents the circle of altitude; the geometrical axis of the trunnions $30^a$—$30^b$ represents the vertical of the present position, for instance of the ship. The system of local coordinates is constituted by the half-circle $6^b$, which represents the equatorial circle, and by the half-circle 18, which represents the circle of declination. The star observed is indicated by the whole of the two riders 26 and 29. The geometrical axis of the bores $6^f$ and $6^g$ represents the parallel to the axis of the world, traced through the spot where one happens to be. The surface I$e$ represents the meridian circle.

The meridian circle I$e$ is graduated in degrees, but only on the half-circumference where the arm 7 moves. Besides the reference line $7^e$, the surface $7^d$ bears the scale or graduations of a vernier permitting the reading of the half-minute. The half-circle 6 is graduated in hours and the surface $25^e$ bears the scale or graduations of a vernier ensuring of the reading of the second. The half-circle 18 is graduated in degrees and the surface $26^c$ of the rider 26 carries a vernier ensuring of the reading of the minute. Finally, the half-circle 30 is graduated in degrees.

In explaining the operation of the apparatus, the calculation of the position of a ship at sea will be taken as example.

It is known that for finding the position of a ship at sea, it is sufficient to draw a line of altitude. For that purpose, the altitude $h$ of a chosen star is observed at a given moment, the reckoned altitude $he$ is then calculated; the difference between the two altitudes is searched and traced at the scale of the chart, according to the horizontal direction where the star is perceived. This horizontal direction forms with the meridian an angle which is the azimuth of the star, which is observed or calculated. The line of altitude is the perpendicular drawn through the point found relatively to the horizontal direction traced.

The problem consists therefore in finding the altitude and azimuth of the star at the reckoned point. Now, the latitude $\varphi$ of this point, the horary angle AI and the declination $\alpha$ of the star at the moment $t$ are obviously known. These three indications render the star tangible; in fact, it suffices:

1.—To place the reference mark $7^e$ in latitude relatively to the geometrical axis of the trunnions $30^a$, $30^b$, the nose $7^b$ moving along the meridian circle Ie when the knob $11^a$ is operated.

2.—To place the half-circle of declination 18 in horary angle on the equatorial half-circle $6^b$, by acting upon the knob $20^b$.

3.—To place the rider 26 in declination on the circle of declination 18, by acting upon one of the two knobs $28^a$, $28^b$.

At this moment, the position of the rider 29 permits of the reading on the circle of altitude 30 the reckoned altitude and the position of this circle of altitude 30 relatively to the horizon circle 31 permits of the reading of the azimuth.

What I claim as my invention and desire to secure by Letters Patent is:

1. In an apparatus for effecting the transformations of spherical coordinates, a circular base, a member in the shape of a half-circle, two bearings carried by the said base, two trunnions carried by the member in the shape of a half-circle and fitting the respective bearings, the geometrical axis of the bores of the bearings forming a diameter of the base, the geometrical axis of the trunnions forming a diameter of the member in the shape of a half-circle, a central pivot rigid with the base, a support rotatably mounted on this pivot, a plate in the shape of a half-circle, carried by this support, the plane of this plate passing through the axis of the pivot, two cylindrical bored bearings in the support, the geometrical axis of these two bores being at right angles to the plate, trunnions mounted in these bearings, a member in the shape of a half-circle capable of rotating on these trunnions, a rider capable of moving along the outer periphery of this second member in the shape of a half-circle, a rider capable of moving along the inner periphery of the first member in the shape of a half-circle, and a joint connecting the two riders, the geometrical axis of this joint constituting a radius of the two members in the shape of a half-circle.

2. In an apparatus for effecting the transformations of spherical coordinates, the combination with the means claimed in claim 1, of means for rotating the support on the central pivot of the base, means for rotating the second member in the shape of a half-circle on the trunnions of the support, and means for rotating the first member in the shape of a half-circle in the bearings of the support.

3. In an apparatus for effecting transformations of co-ordinated spherical bodies, a circular base comprising an annular flange, a member of semi-circular form, two bearings carried by the base, two trunnions carried by the semi-circular member, the geometric axis of the bores of the bearings forming a diameter of the base, the geometric axis of the trunnions forming a diameter of the semi-circular member, a central pivot integral with the socket, a pivotally mounted rotatable support, an arm carried by said support and constructed so that its end moves above the annular flange of the base when the support rotates, a shaft carried by the arm, a gear crown integral with the support, a gear wheel mounted on the shaft, means for rotating said gear wheel, a semi-circular plate carried by the support, the plane of said plate passing through the axis of the pivot, two cylindrical bearings bored into the support, the geometric axis of these two bearings being perpendicular with the plate and passing through its center, shafts mounted in said bearings, a second semi-circular member mounted on said trunnions and rotatable thereon, a gear crown mounted on the plate, a shaft mounted on the second semi-circular member, a gear wheel mounted on the shaft on the second semi-circular member, means for rotating said last mentioned wheel, a rider movable along the external periphery of the second semi-circular plate, a rider movable along the internal periphery of the first semi-circular member, a joint connecting the two riders, the geometric axis of this pivot constituting a radius of the two semi-circular members, a shaft on the first mentioned rider, a gear wheel mounted on the last mentioned shaft and means for rotating the last mentioned gear wheel.

In testimony whereof I have signed my name to this specification.

CHARLES ROGER MONNEY.